US011087013B2

(12) United States Patent
Withrow et al.

(10) Patent No.: US 11,087,013 B2
(45) Date of Patent: Aug. 10, 2021

(54) SECURE DIGITAL FINGERPRINT KEY OBJECT DATABASE

(71) Applicant: ALITHEON, INC., Bellevue, WA (US)

(72) Inventors: Justin Lynn Withrow, Bellevue, WA (US); David Justin Ross, Bellevue, WA (US); Vala Andrésdóttir Withrow, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 381 days.

(21) Appl. No.: 16/254,379

(22) Filed: Jan. 22, 2019

(65) Prior Publication Data
US 2019/0228174 A1 Jul. 25, 2019

Related U.S. Application Data

(60) Provisional application No. 62/620,388, filed on Jan. 22, 2018.

(51) Int. Cl.
G06F 21/00 (2013.01)
G06F 21/62 (2013.01)
(Continued)

(52) U.S. Cl.
CPC .......... G06F 21/6218 (2013.01); G06F 21/44 (2013.01); G06F 21/602 (2013.01);
(Continued)

(58) Field of Classification Search
None
See application file for complete search history.

(56) References Cited

U.S. PATENT DOCUMENTS 4,218,674 A 8/1980 Broscow et al.
4,423,415 A 12/1983 Goldman
(Continued)

FOREIGN PATENT DOCUMENTS

DE 102006005927 8/2007
EP 0439669 8/1991
(Continued)

OTHER PUBLICATIONS

Farid, "Digital Image Forensics," Dartmouth CS 89/189, Sprint 2013, 199 pages.
(Continued)

Primary Examiner — Andrew J Steinle
(74) Attorney, Agent, or Firm — Cozen O'Connor

(57) ABSTRACT

A data store to store and access digital records is provided, and a key object record is initialized in the data store to store data associated with a physical key object. A digital fingerprint of the physical key object is stored in the key object record. Another digital record is created in the data store that is not the key object record. The digital record is linked to the digital fingerprint of the physical key object. The linking is arranged to provide secure control access to the linked digital record. A tendered access key is received via a programmatic interface or user interface, and the data store is queried based on the tendered access key to identify a matching digital fingerprint of a key object. In a case that the querying identifies the matching digital fingerprint of the key object within a prescribed level of confidence, access to the linked digital record secured by the key object is granted.

20 Claims, 4 Drawing Sheets

(51) Int. Cl.
*G06F 21/60* (2013.01)
*H04L 9/32* (2006.01)
*H04L 9/08* (2006.01)
*G06Q 30/00* (2012.01)
*G06F 21/88* (2013.01)
*G06F 21/44* (2013.01)
*G06K 9/62* (2006.01)
*G06K 9/46* (2006.01)
*G06K 9/00* (2006.01)

(52) U.S. Cl.
CPC ............ *G06F 21/604* (2013.01); *G06F 21/88* (2013.01); *G06Q 30/018* (2013.01); *H04L 9/083* (2013.01); *H04L 9/3213* (2013.01); *G06K 9/00577* (2013.01); *G06K 9/4671* (2013.01); *G06K 9/6215* (2013.01)

(56) References Cited

U.S. PATENT DOCUMENTS

| | | | |
|---|---|---|---|
| 4,677,435 A | 6/1987 | Causse D'Agraives et al. |
| 4,700,400 A | 10/1987 | Ross |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1* | 3/2010 | Ross ..................... G06Q 20/02 |
| | | | 705/39 |
| 7,680,306 B2 | 3/2010 | Boutant |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell |
| 9,152,862 B2* | 10/2015 | Ross ..................... G06K 9/00577 |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,596 B2 | 6/2016 | Ross et al. |
| 9,443,298 B2* | 9/2016 | Ross ..................... G06K 9/3216 |
| 9,558,463 B2 | 1/2017 | Ross et al. |
| 9,582,714 B2 | 2/2017 | Ross et al. |
| 9,646,206 B2 | 5/2017 | Ross et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,540,664 B2 | 1/2020 | Ross et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0179931 A1 | 9/2003 | Sun |
| 2003/0182018 A1 | 9/2003 | Snapp |
| 2003/0208298 A1 | 11/2003 | Edmonds |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2005/0007776 A1 | 1/2005 | Monk et al. |
| 2005/0065719 A1 | 3/2005 | Khan et al. |
| 2005/0086256 A1 | 4/2005 | Owens et al. |
| 2005/0119786 A1 | 6/2005 | Kadaba |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |

(56) References Cited

U.S. PATENT DOCUMENTS

| | | |
|---|---|---|
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0282900 A1 | 12/2007 | Owens et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng et al. |
| 2013/0214164 A1 | 8/2013 | Zhang et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0201094 A1 | 7/2014 | Herrington et al. |
| 2014/0184843 A1 | 9/2014 | Campbell et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1* | 4/2015 | Ross ............... G06K 9/00744 382/100 |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0180546 A1 | 6/2016 | Kim et al. |
| 2016/0189510 A1 | 6/2016 | Hutz |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0243232 A1 | 8/2017 | Ross et al. |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |

FOREIGN PATENT DOCUMENTS

| | | |
|---|---|---|
| EP | 0759596 | 2/1997 |
| EP | 1016548 | 7/2000 |
| EP | 1719070 | 4/2009 |
| EP | 2107506 | 10/2009 |
| EP | 2166493 | 3/2010 |
| EP | 2195621 | 11/2013 |
| EP | 2866193 | 4/2015 |
| EP | 2257909 | 5/2015 |
| EP | 2869240 | 5/2015 |
| EP | 2869241 | 5/2015 |
| EP | 3208744 A1 | 8/2017 |
| EP | 3249581 | 11/2017 |
| EP | 3270342 A1 | 1/2018 |
| EP | 3435287 A2 | 1/2019 |
| GB | 2097979 | 11/1982 |
| GB | 2482127 | 1/2012 |
| JP | 61-234481 | 10/1986 |
| JP | 2007-213148 | 8/2007 |
| KR | 20120009654 A | 2/2012 |
| WO | WO 2005/086616 | 9/2005 |
| WO | WO 2006/038114 | 4/2006 |
| WO | WO 2007/028799 | 3/2007 |
| WO | WO 2007/031176 | 3/2007 |
| WO | WO 2007/071788 | 6/2007 |
| WO | WO 2007/090437 | 8/2007 |
| WO | WO 2007/144598 | 12/2007 |
| WO | WO 2009/030853 | 3/2009 |
| WO | WO 2009/089126 | 7/2009 |
| WO | WO 2009/115611 | 9/2009 |
| WO | WO 2010/018464 | 2/2010 |
| WO | WO 2012/145842 | 11/2012 |
| WO | WO 2013/126221 | 8/2013 |

(56) References Cited

FOREIGN PATENT DOCUMENTS

| WO | WO 2013/173408 | 11/2013 |
|----|----------------|---------|
| WO | WO 2015/004434 | 1/2015 |
| WO | WO 2016/081831 | 5/2016 |

OTHER PUBLICATIONS

Huang et al., "A Novel Binarization Algorithm for Ballistic Imaging Systems," 3rd International Congress on Image and Signal Processing, Yantai, China, Oct. 16-18, 2010, pp. 1287-1291.
Huang et al., "An Online Ballistics Imaging System for Firearm Identification," 2nd International Conference on Signal Processing Systems, Dalian, China, Jul. 5-7, 2010, vol. 2, pp. 68-72.
Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.
Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 2 pages.
Smith, "Fireball: A Forensic Ballistic Imaging System: Proceedings of the 31st Annual International Carnahan Conference on Security Technology," Canberra, Australia, Oct. 15-17, 1997, pp. 64-70.
United States Postal Service Publication 28 "Postal Addressing Standards", dated Jul. 2008; text plus Appendix A only; 55 pages.
Boa et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.
Beekhof et al., "Secure Surface Identification Codes," Proceeding of the SPIE 6819: Security Forensics, Steganography, and Watermarking of Multimedia Contents X:68190D, 2008. (12 pages).
Buchanan et al., "Fingerprinting documents and packaging," Nature 436 (7050): 475, 2005.
Di Paola et al., "An Autonomous Mobile Robotic System for Surveillance of Indoor Environments," International Journal of Advanced Robotic Systems 7(1): 19-26, 2010.
Fischler et al., "Random Sample Consensus: A Paradigm for Model Fitting with Applications to Image Analysis and Automated Cartography," Communication of the ACM 24(6); 381-395, 1981.
Kartik et al., "Security System with Face Recognition, SMS Alert and Embedded Network Video Monitoring Terminal," International Journal of Security, Privacy and Trust Management 2(5):9-19, 2013.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.
Matsumoto et al., "Nano-artifact metrics based on random collapse of resist," Scientific Reports 4:6142, 2014 (5 pages).
Rublee et al., "ORB: an efficient alternative to SIFT or SURF," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Shi et al., "Smart Cameras: Fundamentals and Classification," Chapter 2, Belbachir (ed.), Smart Cameras, Springer, New York, New York, USA 2010, pp. 19-34.
Takahashi et al., Mass-produced Parts Traceability System Based on Automated Scanning of "Fingerprint of Things," 15th IAPR International Conference on Machine Vision Applications, Nagoya, Japan, May 8-12, 2017, 5 pages.
Veena et al., "Automatic Theft Security System (Smart Surveillance Camera)," Computer Science & Information Technology 3:75-87, 2013.
United States Postal Services, NCOALink® Systems, dated May 27, 2009, URL=http://ribbs.usps.gov/ncoalink/ncoalink_print.htm, download date Jun. 23, 2010, 3 pages.
Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).
Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages).
Entrupy.com Website History, Wayback Machine; https://web.archive.org/web/20160330060808/https://www.entrupy.com/; Mar. 30, 2016 (Year: 2016), 2 pages.
Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.
Mistry et al., "Comparison of Feature Detection and Matching Approaches: SIFT and SURF," Global Research and Development Journal for Engineering, vol. 2, Issue 4, Mar. 2017, 8 pages.
Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.
Drew, M. S., et al., "Sharpening from Shadows: Sensor Transforms for Removing Shadows using a Single Image," Color and Imaging Conference, vol. 5, Society for Imaging Science and Technology, 2009, pp. 267-271.
Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.
United States Postal Service, "NCOALink® Systems," https://web.archive.org/web/20100724142456/http://www.usps.com/ncsc/addressservices/moveupdate/changeaddress.htm; download date Jun. 23, 2010, 2 pages.
Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hiibner, S. Tseng, J., Barking, J.: (Boston: Springer), pp. 57-77 (21 pages).

* cited by examiner

SECURE DIGITAL FINGERPRINT KEY OBJECT DATABASE

COPYRIGHT NOTICE

COPYRIGHT© 2018-2019 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71 (d) (2019).

BACKGROUND

Technical Field

The present disclosure generally relates to a granting or denying access to digital information based on control of a physical device. More particularly, but not exclusively, the present disclosure relates to devices, methods, and systems that utilize a physical object, which may be called a "key object," to securely control access to a digital object that may comprise, for example, a provenance history or pedigree of a physical object.

Description of the Related Art

Some aspects of technologies and related art that may be useful in understanding the present invention are described in the following publications, which are each incorporated herein by reference in their respective entirety:

U.S. patent application Ser. No. 11/277,133, which is also U.S. Pat. No. 7,676,433, to Ross et al, which describes, among other things, secure confidential authentication with private data;

U.S. patent application Ser. No. 15/862,556, which is also published U.S. Pat. Publication No. 2018/0144211 A1 by Ross et al., which describes, among other things, a database for detecting counterfeit items using digital fingerprint records;

U.S. patent application Ser. No. 13/618,362, which is also U.S. Pat. No. 9,152,862 by Ross et al., which describes, among other things, embodiments of digital fingerprinting;

U.S. patent application Ser. No. 13/618,362, which is also U.S. Pat. No. 9,152,862 B2 by Ross et al., which describes, among other things, embodiments of object identification and inventory management;

U.S. patent application Ser. No. 14/531,724, which is also U.S. Pat. No. 9,443,298 B2 by Ross et al., which describes, among other things, digital fingerprinting object authentication and anti-counterfeiting systems;

U.S. patent application Ser. No. 15/436,631, which is also U.S. Pat. No. 10,037,537 B2 by Withrow et al., which describes, among other things, personal history in track and trace systems; and U.S. patent application Ser. No. 15/436,616, which is also U.S. Pat. Publication No. 2017/0243230 A1 by Ross et al., which describes, among other things, embodiments of preserving authentication under item change.

Property is commonly divided into two categories, real property (i.e., realty or land) and personal property (i.e., personalty or chattels). Unlike real property registries, only a few centralized registries of personal property are in operation. Common personalty registries currently employed are the vehicle and vessel registries operated by federal and state agencies. Currently existing personalty registries generally depend upon general object descriptions and/or external or affixed identifiers to link a registered object, such as a license plate, to connect an object of personal property to the digital record containing its object information. Currently, there exists no centralized resource for recordation and verification of personal property provenance without the use of an externally affixed identifier and/or general description of the physical characteristics (e.g., make/model, year, VIN number, dimensions, color, etc.). Known systems are therefore vulnerable to the loss of an affixed identifier, confusion between similar objects, and to the counterfeiting of either an object and/or an identifier.

In addition, there exists no centralized system for personal property registration that offers certainty of identification as well as provenance, without relying on affixed identifiers (i.e., identity proxies) or object descriptions. A system based on identifying objects using only the object's own inherent or native features is needed to provide an effective barrier to theft, counterfeiting, and other mischief. Stolen and counterfeit personal property items represent a significant problem in global commerce, causing participants, underwriters, law enforcement, and others billions in losses every year. Some conventional publications have recently estimated that the total value of counterfeit goods sold worldwide per annum may be as high as $1.8 Trillion.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable a physical object of any type to be used as a key that grants access to a same or different physical object, or a digital object (e.g., a digital record, digital file, or any other type of digital information). A digital fingerprint for the physical object is generated, and the digital fingerprint is linked to the object that will be secured. Subsequent access to the secured object is granted to an interested entity when the interested entity is able to generate or otherwise acquire access to a digital fingerprint of the physical object (e.g., the physical key object).

The following is a summary of the present disclosure to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

A non-transitory computer-readable storage medium whose stored contents configure a computing system to perform a method may be summarized as including provisioning a data store operatively coupled to the computing system for storing and accessing digital records; initializing a key object record in the data store to store data associated with a physical key object; storing a digital fingerprint of the physical key object in the key object record; creating a digital record in the data store that is not the key object record; linking the digital record to the digital fingerprint of the key object to securely control access to the linked digital record; receiving a tendered access key via a programmatic or user interface coupled to the computing system; querying the data store based on the tendered access key to identify a matching digital fingerprint of a key object; and in a case that the querying step identifies a matching digital fingerprint of a key object within a prescribed level of confidence, granting access to the linked digital record secured by the matching key object.

The method may further include authenticating a user as a proprietor of the linked digital record based on an access key tendered by the user; responsive to input from the authenticated user, modifying the digital record to enable a second key object to grant access to the digital record secured by the first key object; initializing a second key object record in the data store to store data associated with the second key object; storing a digital fingerprint of the second key object in the second key object record; and further linking the linked digital record to the digital fingerprint of the second key object. The first key object may permit first access rights to the linked digital record and the second key object may permit second access rights to the linked digital record, where the second access rights are different from the first access rights. The linked digital record secured by the key object may correspond to a first physical object, and the digital record may include a digital fingerprint acquired from the first physical object for uniquely and reliably identifying or authenticating the first physical object. The first physical object may be the physical key object. The first physical object may be a different object from the physical key object. The linked digital record may include or link to historical provenance data of the physical object. The granted access may be circumscribed by permissions stored in the key object record or the linked digital record. The linked digital record may include digital pedigree data of the first physical object; and permissions stored in the data store in association with the matching access key may permit additions to the stored pedigree data. The pedigree data may include supplemental context data comprising location and/or other metadata, media, or sensor data. The pedigree data may include supplemental context data comprising records of purchase or transfer of the first physical object. The first key object may be a certificate of authenticity of the first physical object.

The method may further include generating a digital companion as a component of the digital pedigree to the first physical object, wherein the digital companion is a representation created by aggregating various sensor data acquired in relation to the physical object over a selected period of time.

The method may further include generating the digital companion based on optical sensor data to create the structure and texture of the digital companion; and creating an object-specific 3D digital re-creation of the first physical object based on the digital companion.

The method may further include forming an aggregate digital companion, by aggregating each component of the first physical object, using nested authentication.

The method may further include receiving an access key via a third-party app or user interface; authenticating the access key based on identifying a matching key object record in the data store; and conditioned on the authenticated key granting rights to change access rights, changing the access rights to the corresponding digital record to enable use of credentials comprising at least one of a specified user name, a specified password, and a second key object defined by a digital fingerprint of the second key object.

The method may further include receiving an access key via a third-party app or user interface; authenticating the access key based on identifying a matching key object record in the data store; receiving certification data via the third-party app or user interface; and conditioned on the matching key object record permitting addition of certification data, storing the certification data as pedigree data of a physical object record linked to the matching key object record.

A computer-implemented method may be summarized as including acquiring a unique digital fingerprint of a first key object; storing the digital fingerprint of the first key object in a key object record of a data store; creating a digital record in a data store that is not the key object record; linking the digital record in the data store to the digital fingerprint of the first key object to securely control access to the digital record; receiving a tendered access key; querying the data store based on the tendered access key to identify a matching digital fingerprint of a key object; and in a case that the querying step identifies a matching digital fingerprint of a key object within a prescribed level of confidence, granting access to the linked digital record secured by the matching key object.

Granting access to the linked digital record secured by the matching key object may include transferring the linked digital record to securely complete a transaction involving the linked digital record.

The computer-implemented method may further include receiving an access key tendered via a programmatic or user interface; authenticating a user as a proprietor of the digital record secured by the first key object based on the access key; responsive to input from the authenticated user, modifying the digital record to enable a second key object to grant access to the digital record secured by the first key object; initializing a second key object record in the data store to store data associated with the second key object; storing a digital fingerprint of the second key object in the second key object record; and further linking the digital record to the digital fingerprint of the second key object to enable access to the digital record without requiring the first key object. The first key object may permit first access rights to the digital record and the second key object may permit second access rights to the digital record, where the second access rights are different from the first access rights. The linked digital record may include sensitive data so that the sensitive data is protected by requiring that a token comprising a digital fingerprint of the first or second key object be presented to access the sensitive data.

Additional aspects and advantages of this disclosure will be apparent from the following detailed description of preferred embodiments, which proceeds with reference to the accompanying drawings.

BRIEF DESCRIPTION OF THE SEVERAL VIEWS OF THE DRAWINGS

To enable the reader to realize one or more of the above-recited and other advantages and features of the present disclosure, a more particular description follows by reference to specific embodiments thereof which are illustrated in the appended drawings. Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings.

Understanding that these drawings depict only some embodiments of the disclosure and are not therefore to be considered limiting of its scope, the present disclosure will be described and explained with additional specificity and detail through the use of the accompanying drawings in which.

DETAILED DESCRIPTION

Figure 1:
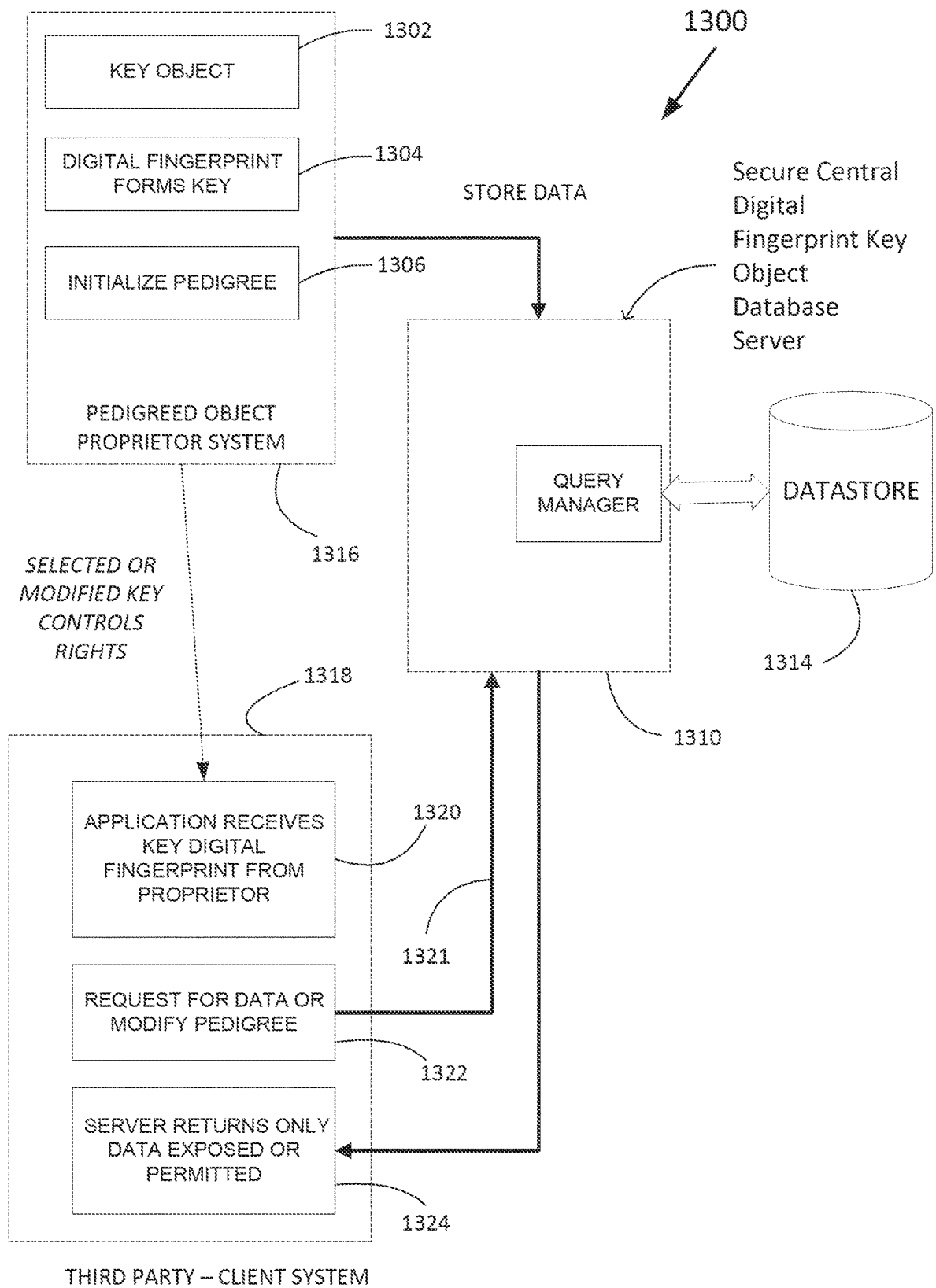
FIG. 1 is a simplified block diagram of one example of a secure digital fingerprint key object database system consistent with the present disclosure.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

The device, method, and system embodiments described in this disclosure (i.e., the teachings of this disclosure) a physical object of any type to be used as a key that grants access to a same or different physical object, or a digital object (e.g., a digital record, digital file, or any other type of digital information). A digital fingerprint for the physical object is generated, and the digital fingerprint is linked to the object that will be secured. Subsequent access to the secured object is granted to an interested entity when the interested entity is able to generate or otherwise acquire access to a digital fingerprint of the physical object (e.g., the physical key object).

Digital pedigree" or simply "pedigree" in the present disclosure refers to a digital file that contains information about an object. The object may be physical or digital. For a physical object, the pedigree may also be called a "digital companion." A digital companion supports the notion that a physical object may have value separate from its physical makeup. Thus, for example, a bottle of wine once owned by Humphrey Bogart may be perceived by some to be more valuable than the same vintage not owned by Humphrey Bogart. Here, the information on ownership history (e.g., historical provenance data) is the digital companion of the physical bottle of wine. The digital companion may contain any type or volume of data. The digital companion may contain a digital fingerprint or link to a digital fingerprint, for example. The digital fingerprint will be generated as described herein from the physical object. The digital companion may contain a physical model of the physical object (e.g. like the physical model created for model-based digital fingerprinting). In the present disclosure, for simplicity, the term digital pedigree (or simply pedigree) will be used with the understanding that the digital pedigree may include a digital companion as appropriate to the context.

Data associated with the digital pedigree may be referred to as digital pedigree data. Various digital pedigree data, as described in the present disclosure, includes data associated with a particular physical object, context data, supplemental context data (e.g., location data, metadata, media such as audio and video, scientific data, sensor data, records of purchase, records of transfer of the associated physical object, certification data, authentication data, and many other types of data. The pedigree data may be added to, subtracted from, modified, or acted on in other ways at various times.

This disclosure provides for any physical object to be the means for controlled (i.e., secure) access to any digital object. The physical object may interchangeably be referred to as the "key object," "physical key object," or some other like term. The digital object may be any digital asset or file, such as a digital data store record. The digital object may be referred to as a digital record, a digital file, or any other like term. In some applications, the digital object may be or include a pedigree or some other information related to possession and ownership interest of a physical asset or a digital asset. A physical object may give access to a digital record that contains its own history and identification data ("pedigree"), but the present disclosure may be applied for virtually any physical object to be used to grant or control access to any digital object.

A physical object from which a digital fingerprint may be extracted (i.e., "a key object," "physical key object," or the like) may be defined, and a second object (e.g., "a pedigreed object") whose digital pedigree may be accessed through the digital fingerprint of the key object may be defined. In some embodiments, the key object and the pedigreed object may be the same object. As discussed herein, one purpose of a key object is to give its holder specific access or, in other words, control access, to a digital pedigree of the pedigreed object. It should be understood where not specifically called out that access to a pedigree in some embodiments will always require possession of the corresponding key object or to information such as a password or personal identification number (PIN) proving the accessor has a legitimate relationship with the key object. In some embodiments, access may be granted to a user who has additionally or only a digital fingerprint of the key object.

When a protected digital record is created, the protected digital record is linked to the digital fingerprint of a specific object (i.e., the key object). The digital record may comprise a digital asset, information, an outcome, or some other information. The digital record is protected in the understanding that a digital fingerprint is required in at least some embodiments to access the digital record. The key object may or may not have some other relationship to the contents of the digital record besides being its key, but such is not a requirement, at least in some embodiments. Access to the digital record then may be obtained in one of several ways.

In one simple case, access may be obtained by generating the digital fingerprint of the key object, and submitting the digital fingerprint to a particular computing system. The computing system referred to here, which is further described herein, is configured to realize (e.g., provide, enable, support, facilitate, or the like) a trust proxy scheme consistent with the present disclosure. The computing system checks that the digital fingerprint properly matches the record for the key object in the digital record. If such a match is established, the computing system grants access to the digital record or digital object secured by the key object, circumscribed by, or otherwise in accordance, with permissions specified by the key object record. Access may be granted to a pedigree and/or to any other type of access-controlled object, information, or outcome, which may include, for example, access to a secure space, that the key object is designated to unlock.

In some embodiments, the secured or otherwise protected digital record may be changed to allow another object or set of objects (i.e., key objects) to grant access. Additionally, or alternatively, the original digital record may be arranged to recognize multiple key objects as having sufficient authority to each grant the same or different access rights. After the rights to access the protected digital record have been transferred or shared by a possessor of the original key object or its digital fingerprint, the other objects now become key objects. Hence, any one or more key objects may be understood as a digital key to a secure digital record or as a physical object capable of generating a digital key to the secure digital record. In some embodiments, multiple digital keys may be needed to gain access to a secure digital record, or a combination of digital keys may be needed to gain access to the secure digital record. Gaining access may include providing the ability to read, execute, unlock, modify, supplement, delete, or otherwise control the digital record. Gaining such access may include unlocking a digital asset, unlocking a digital file, or permitting some other outcome. In these or other embodiments, one digital key may be arranged to control multiple outcomes.

In some scenarios, access granted might be limited or unlimited or even compartmentalized, for example, because an object is owned by joint tenants or tenants-in-common or is involved in some other complex ownership structure or is subject to some type of structured access among those who do or could potentially have access. Access examples are not limiting. Access granting within preferred systems may be structured in any desired manner, such as staggered, incremental, layered, partial, or access may take any other form or combinations of forms of known methods of access control and may require the use of one or many keys or keys of different types or a particular combination of keys.

In some embodiments, instead of granting access rights to other objects as described, the key object can allow access through, for example, a user name and password, a digital certificate, or any other means. The key object can also in some cases allow uncontrolled access to the digital record. Key objects can establish when the digital record is linked to the digital fingerprint of the key object. Thereafter, in some embodiments, other key objects or user name/passwords may receive the access rights granted to them in that record, assuming that the key object used to make those changes had previously been used to grant access rights that allowed those changes.

One embodiment of this disclosure teaches a method to use a digital fingerprint to create a digital companion as a component of the digital pedigree to a physical object. A digital companion may be a representation created by snap-shotting, accumulating, or otherwise storing or referencing various sensor data from or related to the key object across time. Such techniques may be used to create an object-specific three dimensional (3D) digital re-creation of the original physical object. The digital companion may be made using optical sensor data, for example, to create the structure and texture of the digital companion or, for an aggregate digital companion, may be itself aggregated from each component of the original physical object, using nested authentication.

Digital Fingerprinting

The term "digital fingerprint" in all its grammatical forms and constructs, is used throughout the present specification and claims to refer to a computationally unique digital identifier of a physical object or a portion of a physical object. To the limitations of the available computational resources, each and every digital fingerprint identifying a determined portion of a physical object is different from each and every other digital fingerprint identifying a different physical object or identifying a different portion of the same physical object. And to the limitations of the available computational resources and the preservation of the determined portion of the physical object on which a first digital fingerprint is generated, each and every subsequent digital fingerprint identifying the same determined portion of the same physical object is statistically the same as the first digital fingerprint. In at least some cases, a digital fingerprint, as the term is used herein, is generated in a method that includes acquiring a digital image, finding points of interest within that digital image (e.g., generally, regions of disparity where "something" is happening, such as a white dot on a black background or the inverse), and characterizing those points of interest into one or more feature vectors extracted from the digital image. Characterizing the points of interest may include assigning image values, assigning or otherwise determining a plurality of gradients across the image region, or performing some other technique. The extracted feature vectors may or may not be analyzed or further processed. Instead, or in addition, the extracted feature vectors that characterize the points of interest in a region are aggregated, alone or with other information (e.g., with location information) to form a digital fingerprint.

"In embodiments of the present disclosure, digital fingerprinting includes the creation and use of digital fingerprints derived from properties of a physical object. The digital fingerprints are typically stored in a repository such as a register, a physical memory, an array, a database, data store, or some other repository. Storing the digital fingerprint in the repository may include or in some cases be referred to as inducting the respective physical object into the repository. Digital fingerprints, whether immediately generated or acquired from a repository, may be used to reliably and unambiguously identify or authenticate corresponding physical objects to an acceptable level of certainty, track the physical objects through supply chains, and record their provenance and changes over time. Many other uses of digital fingerprints are of course contemplated.

Digital fingerprints store information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a repository (e.g., a database, data store, memory, or the like) to an object. Thus, in general, a digital fingerprint may be derived from a first object directly, or it may be derived from a different object (e.g., a file) linked to the first object, or a combination of two or more sources. In the audio example, the audio file may be a recording of a person speaking a particular phrase. The digital fingerprint of the audio recording may be stored as part of a digital fingerprint of the person speaking. The digital fingerprint (e.g., the digital fingerprint of the person) may be used as part of a system and method to later identify or authenticate that person, based on their speaking the same phrase, in combination with other sources.

Returning to the 2-D and 3-D object examples discussed herein, feature extraction or feature detection may be used to characterize points of interest. In an embodiment, this may be done in various ways. Two examples include Scale-Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB etc. SIFT and SURF are most useful approaches to detect and matching of features because of it is invariant to scale, rotate, translation, illumination, and blur." MISTRY, Darshana et al., *Comparison of Feature Detection and Matching Approaches: SIFT and SURF*, GRD Journals—Global Research and Development Journal for Engineering|Volume 2|Issue 4|March 2017.

In an embodiment, features may be used to represent information derived from a digital image in a machine-readable and useful way. Features may comprise point, line, edges, blob of an image, etc. There are areas such as image registration, object tracking, and object retrieval etc. that require a system or processor to detect and match correct features. Therefore, it may be desirable to find features in ways that are invariant to rotation, scale, translation, illumination, and/or noisy and blurred images. The search of interest points from one object image to corresponding images can be very challenging work. The search may preferably be done such that the same physical interest points may be found in different views. Once located, points of interest and their respective characteristics may be aggregated to form a digital fingerprint, which may include 2-D or 3-D location parameters.

In an embodiment, features may be matched, for example, based on finding a minimum threshold distance. Distances can be found using Euclidean distance, Manhattan distance, or other suitable metrics. If distances of two points are less than a prescribed minimum threshold distance, those key points may be known as matching pairs. Matching a digital fingerprint may comprise assessing a number of matching pairs, their locations, distance, or other characteristics. Many points may be assessed to calculate a likelihood of a match, since, generally, a perfect match will not be found. In some applications a "feature template" may be used to define locations or regions of interest for a class of objects.

The term, "induction," as used in the present disclosure, refers to acts that include generating and storing, or otherwise acquiring access to, at least one digital fingerprint of a physical object, and storing the one or more digital fingerprints in a repository. Each stored digital fingerprint may be communicatively linked (i.e., associated) with other information related to the physical object. Hence, induction may also include acts that store additional information related to the physical object in a same or different repository. The additional information may be stored in association with any number of digital fingerprints. The association may include storing associated data in a common or shared repository record, communicatively linking one or more repository records together, or via other techniques known in the art to link information. For the sake of illustration and not limitation, induction may include storing one or more digital fingerprints in a new or existing repository record and further storing some other type of information, whether related to one or both of the physical object and the digital fingerprint, in a same or linked repository record.

Scanning

In the present disclosure, the term, "scan," in all of its grammatical forms, refers illustratively and without limitation to any and all means for capturing an image or set of images, which may be in digital form or transformed into digital form. Images may, for example, be two dimensional (2-D), three dimensional (3-D), or in the form of video. Thus a scan may refer to one or more images or digital data that defines such an image or images captured by a scanner, a camera, an imager, a 3D-sense device, a LiDAR-based device, a laser-based device, a specially adapted sensor or sensor array (e.g., a CCD array), a microscope, a smartphone camera, a video camera, an x-ray machine, a sonar, an ultrasound machine, a microphone (i.e., any instrument for converting sound waves into electrical energy variations), and the like. Broadly, any device that can sense and capture either electromagnetic radiation or a mechanical wave that has traveled through an object or reflected off an object, or any other means to capture surface or internal structure of an object, is a candidate to create a scan of an object. Various means to extract features from an object may be used. For example, features may be extracted through sound, physical structure, chemical composition, or many other means. Accordingly, while the term, images, and cognates of the term, images, are used to form the digital fingerprints described herein, the broader application of scanning technology will be understood by those of skill in the art. In other words, alternative means to extract features from an object should be considered equivalents within the scope of this disclosure. Along these lines, terms such as "scanner," "scanning equipment," and the like as used herein may be understood in a broad sense to refer to any equipment capable of carrying out scans as described above, or to equipment that carries out scans as described above, as part of their function.

Authentication

In this application, different forms of the words "authenticate" and "authentication" will be used broadly to describe both authentication and attempts to authenticate, which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a repository (e.g., a database) for subsequent reference, this action too may be described as "authentication" or "attempted authentication," and this action may also, post facto, be properly described as an induction. An authentication of an object may refer to the induction or authentication of an entire object or of a portion of an object.

Physical Objects to Control Access to Digital Objects

A physical object from which a digital fingerprint may be extracted (i.e., "a key object") is defined, and a second object (i.e., "the pedigreed object") whose digital pedigree (or any information or outcome) may be accessed through the digital fingerprint of the key object is defined, as introduced herein. In some embodiments, the purpose of the key object is to give its holder specific access, in other words control access, to the digital pedigree of the pedigreed object. It should be understood where not specifically called out that access to a pedigree in at least some embodiments always requires possession of the corresponding key object or to information such as a password or PIN proving the accessor has a legitimate relationship with the key object. In some embodiments access may be granted to a user who has additionally or only a digital fingerprint of the key object. In some embodiments, the key object holder may modify the terms of access, including granting controlled access to others.

The key object and the pedigreed object need not be the same object. Indeed, the pedigreed object may be itself purely digital. For example, the pedigreed object may be a digital contract that can, for example, be set up so to only be read by possessors of the physical key object. The pedigree may be or otherwise include certain digital information linked to the digital fingerprint of the key object, including entirely digital representations, both visual and non-visual, such as a digital companion. The pedigree may include any information, including actual pedigree information, that might be digitally associated with the pedigreed object and accessible through the key object's digital fingerprint.

In at least some embodiments, one primary purpose of a key object is to be a token for the pedigreed object. As an example of where the key object is a token for accessing a different pedigreed object, a digital photograph may be made accessible throughout the possession of a key, which may, for example, be a certificate of authenticity for the digital photograph. The digital fingerprint of the physical certificate then provides a mechanism for access to the digital photograph.

In an embodiment, each transaction related to a pedigreed object updates a data store showing ownership or other relationships to the object. When the possessor has or is ready to engage in a transaction that concerns or relates to the object, such as insuring, renting, or sale of the object, the possessor may send information, for example a link such as a secure URL, to a digital fingerprint pedigree and/or digital companion data store containing the record and/or curated records related to the object.

Figure 4:
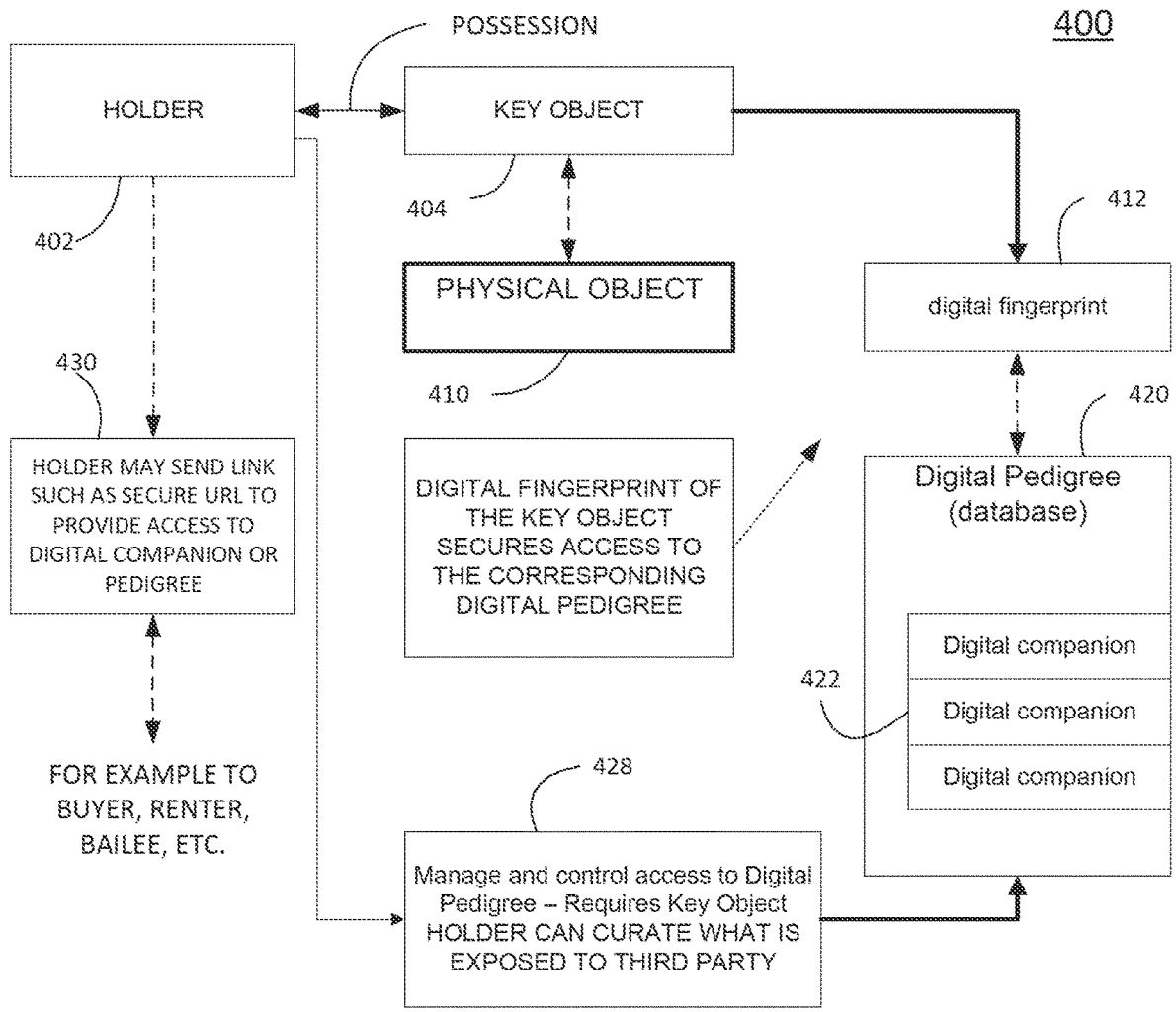
FIG. 4 is a simplified illustration of selected features of secure digital fingerprint key object database system operation.

FIG. 4 provides a simplified illustration. Diagram 400 is a simplified illustration of one example of system operation. Here, a "holder" 402 is a person or entity having possession (or an equivalent of possession such as secure, exclusive physical access) of a physical key object 404. The key object will be used to secure access to a physical object 410 in this example. A digital fingerprint 412 of the key object is generated from scanned image data, for example, and the digital fingerprint is stored in a secure data store 420—here serving as the digital pedigree database. In the data store, a stored digital companion 422 is associated with the physical object 410. The holder of the key object 404 may hold a copy of the digital fingerprint of the key object 404, or the holder can re-generate the digital fingerprint as needed since he has possession of the key object 404. That digital fingerprint gives the holder access to the companion 422, and the holder may be permitted to set permissions, for example, to read, write or update, by interaction with the database system that manages or has access to the data store 420.

As noted at block 428, the holder controls access to the digital pedigree and can curate what is exposed to a third party. In one example, see block 430, the holder 402 may send a link such as a secure URL, to a buyer, bailee, renter, etc. The secure link in at least one case is to the digital fingerprint pedigree 422 and/or digital companion data store 420 containing the record or curated records related to the physical object 410.

Data shared via this process may contain, for example:

Records showing information pertaining to the specific individual or object

Digital companions or other representations of the individual or object

Digital pedigree and, optionally, a transaction history

Digital fingerprint(s) that may be used for authentication or verification

Contract terms, such as terms of sale, where pricing and/or other preferred transaction information is specified or negotiated Regardless of the content of the digital pedigree, the teachings of this disclosure provide the ability for digital fingerprint holders to curate what data is exposed in the pedigree. Additional non-verified data may in some cases be added to the pedigree by anyone, by a select group, by someone with access to the pedigreed object, or by the possessor of the "key" object. In these cases, however, the non-verified data will be flagged accordingly as non-verified.

In some cases, an object may serve as both the pedigreed object and its own key object. Consider an example where digital pedigree data of a valuable painting is accessed from the painting itself. Here the painting is acting as both the key object and the pedigreed object. Or, the pedigree information may be linked to a certificate of authenticity related to the painting. In this example, the certificate acts as a key object that can enable access to all pedigree information for the painting, which again is the pedigreed object.

In at least one embodiment, the attributes of an object may reside in two places. The attributes may reside physically in the object itself if the object is physical, and alternatively or additionally, the attributes may reside within the pedigree of the object, securely linked through a digital fingerprint. The tight linkage of a physical object to the digital pedigree of that object enables all relevant forms of value, whether physical or digital, to accrue to the object itself. In some embodiments, "physical object plus securely linked pedigree" may replace the physical object itself in whole or in part as the bearer of value.

In embodiments described herein, the term, digital companion, is used broadly in reference to any unique digital representation within the digital pedigree. A "digital companion" or object-specific, multi-dimensional model of the physical object is created at each induction or authentication of the object and linked into the object's digital pedigree. In some embodiments, a digital companion may be a representation created by snapshotting various sensor data from the object across time. This data may be used to create an object-specific 3D digital re-creation of the original physical object.

Throughout this disclosure, the term "sensitive" or "sensitive data elements" is meant to broadly encompass all forms of data intended to be secured or kept private. In many cases, sensitive data is more valuable to an individual if the sensitive data is kept private.

Trust Proxy and Ownership

Digital Fingerprint Pedigree and Data Management

In one embodiment, the digital pedigree of an object may contain all the relevant activity and transaction history of the object, including records of how the object was created, transferred, or sold in the past. This disclosure teaches, among other things, the ability to modify the pedigree through possession of a specific object (a key object) whose digital fingerprint forms an access key to the digital pedigree. That is, modification of the pedigree may be controlled by possession of the key object. If, for example, that pedigree includes data that allows the chain of ownership to be established from manufacturer to current possessor of the corresponding physical object, that digital pedigree becomes a proof of ownership as well as proof of authenticity. While the digital pedigree may only be altered by someone who has, or by someone who has had, possession of the digitally-fingerprinted key object, this disclosure's teachings also have in view the idea that third parties may be granted different levels of access. The granted access may be circumscribed by permissions stored in the key object record or the linked digital record. The access may, for example, be defined such as "read only" views or non-sensitive views that may allow the user to view or add non-sensitive data to the pedigree.

Approaches taught in embodiments described herein allow general information to be stored digitally and linked to an object for common use. Common use in this case means that the data is not considered sensitive. Consider an example, where a gallery hosts artwork such as paintings. A visitor could use sensor data from a smartphone to create a digital fingerprint the painting. Here, the painting serves as both the key object and the pedigreed object. This would allow the user to link to non-sensitive elements of the public-facing view of the object's digital pedigree, where he could, optionally, add to or view data provided by other viewers. Consider for example, a gallery viewing making public comments or providing feedback on the specific painting or accessing comments made by other viewers. In effect, this creates a virtual 'comments section' specific to each unique object. In at least some cases, each viewer will have confidence that all comments are added only by others who have actually viewed the artwork.

Referring now to FIG. 1, a simplified block diagram of a system 1300 is shown, arranged to implement a secure digital fingerprint key object database system consistent with an embodiment of the present disclosure. Here, a pedigreed, or a to be pedigreed, physical object 1410, 410 (FIG. 2, FIG. 4, respectively) is associated with a key object 1302. The key object is under possession or control of a proprietor of the pedigreed object, for example an owner or manufacturer of the pedigreed object. The pedigreed object may be any digital asset or digital or physical object. The proprietor or possessor of the pedigreed object has access to a pedigreed object proprietor system 1316 to carry out operations described herein. The system 1316 may be realized as an interface to a computing server 1310. The key object is scanned, and a digital fingerprint is formed, 1304. The digital fingerprint of the key object may serve as a key to the pedigreed object. A pedigree record or data set may be initialized, block 1306. The key object digital fingerprint and initial pedigree data of the corresponding pedigreed object are stored in a secure digital fingerprint key object database system which may be realized, for example, by computing server 1310. The computing server 1310 stores the data in a data store 1314, utilizing any of various known database technologies.

A third-party client system, software application, programmatic interface, user interface 1318 or the like enables third-party operations and access rights to the pedigree or other digital asset as defined by the key object. In operation, a third-party may receive a key object digital fingerprint from the proprietor, block 1320, for example, stored in a portable memory (e.g., thumb drive, flash drive, Internet of Things (IoT) device, wearable computing device, smart phone or other mobile device, or any other such portable memory), or accessed by a secure link or URL. Rights circumscribed or otherwise defined by the proprietor using system or interface 1316 may enable the third-party to access certain data, block 1322, for example, aspects of the pedigree data provided from data store 1314 via path 1321. The third-party user may be granted access to modify or supplement the pedigree data. The computing server 1320 returns only data permitted to be exposed by the rights associated with the key object digital signature that was provided, block 1324.

In another embodiment, the combination taught here of a digital pedigree with a digital fingerprint key to that pedigree may allow the establishment, management, and/or administration of shared or fractured ownership of at least one physical object and its pedigree, where one or more parties are concurrently listed as owners in the pedigree, or having other types of concurrent legal interests in the object. This embodiment enables multiple parties to receive the object and share ownership interests and other legal interests, and includes all the various types of joint ownership or interest arrangement, including possession, bailment, use, lease, rent, and other forms of concurrent interests in an object. These systems, methods, and devices allow participants, for example, to select from various ownership schemes and create their own terms. In one example, each participant may be granted full ownership, or a percentage of ownership, based upon their varying financial contribution. Any or all contractual terms of these arrangements may be built into the pedigree. Consider a scenario where a valuable painting was purchased and shared between several parties. Depending on the scheme selected, each participant may have partial or full ownership of the painting. Each participant will have their own rights to, or benefits from, the painting, including the rights to sell if the underlying contract permits. This example is not limiting, other existing structures of shared interest and ownership may be substituted for the one herein described.

Figure 2:
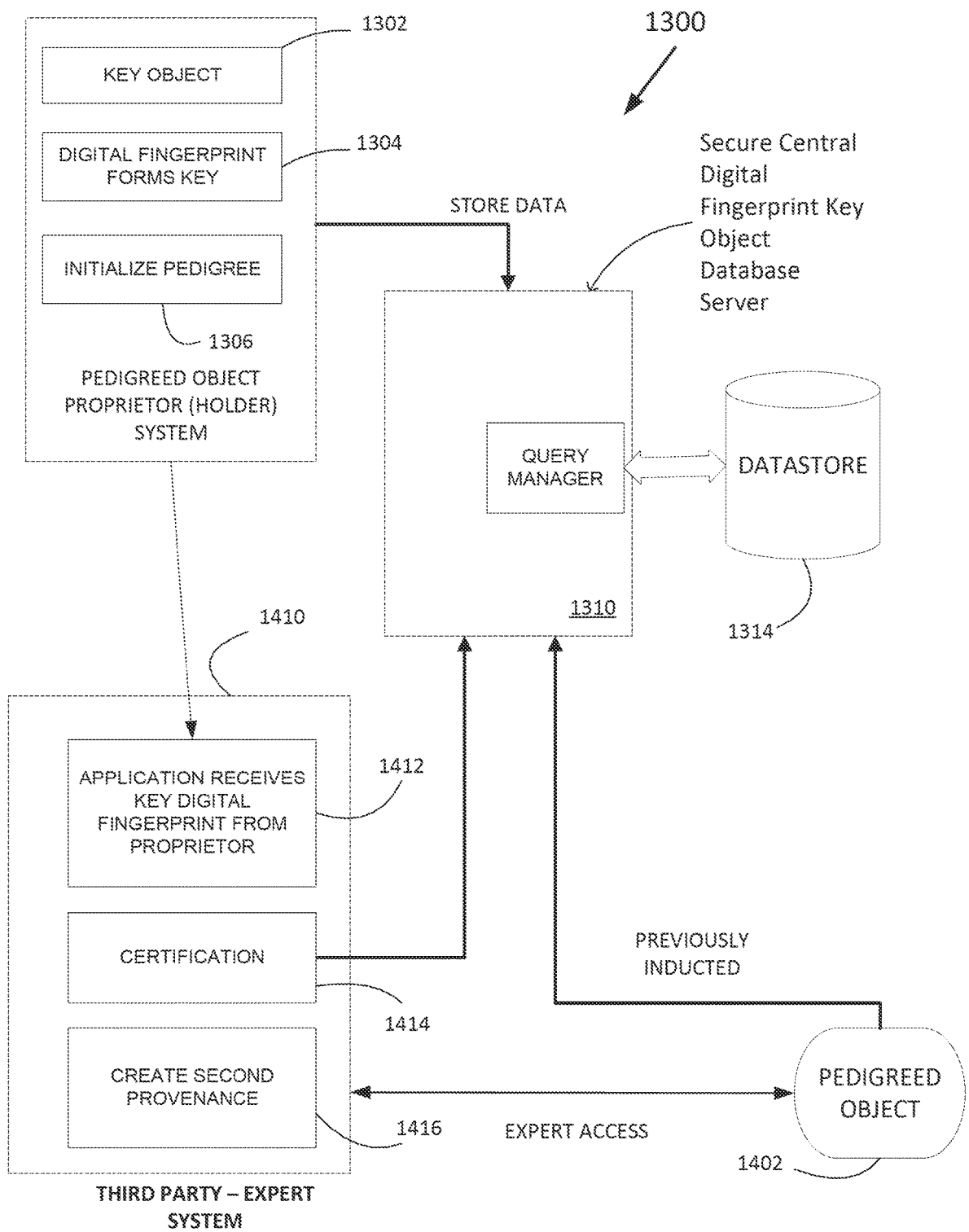
FIG. 2 is a simplified block diagram of one example of a secure digital fingerprint key object database system illustrating establishment of a second provenance or certification or both in the pedigree of a digital object.

Referring now to FIG. 2, a simplified block diagram similar to FIG. 1 is shown. Accordingly, description of the common elements of FIG. 1 will not be repeated. In FIG. 2, a pedigreed object 1402 may be loaned or made available to an expert system or person to be authenticated. In this example, the pedigreed object is likely to be a physical object, but it may be a digital asset. The pedigreed object 1402 has been previously inducted into a repository (e.g., a register, a physical memory, an array, a database, data store, or some other repository) such as database 1314. The expert interacts with a suitable client software application 1410, arranged for interfacing with the computing server 1310. If that authentication is successful, the expert may add a certification 1414 into the digital pedigree at the appropriate timing and place. In this example, the expert client system 1410 submits the certification 1412, optionally over a computationally communicative network, to the central secure server 1310 to update the pedigree in data store 1314.

If the object 1402 being authenticated requires a physical key object different from the object being authenticated, the expert must have access to that key object or a digital fingerprint derived from that key object, as well as to the object 1402 being authenticated. If the object being authenticated is purely a digital object, the key object's digital fingerprint "unlocks" the expert's access to the digital object for the purpose of attempted authentication. In any event, the expert's possession of the key object allows him to modify the pedigree of the authenticated object via the database server 1310 once he has established its authenticity or unauthenticity.

In some embodiments, the combination taught here of a digital pedigree with a digital fingerprint key to that pedigree may also allow the establishment of second provenance. At the point when an expert, say, authenticates the object, digital proof of that authentication may be entered by the expert into the object's digital pedigree; see block 1416. That information then follows the object from then on as part of that pedigree.

In a system of the type illustrated in FIGS. 1 and 2, a wide variety of database tables and records can be arranged using known technologies. Here a few examples are provided. A sample record may correspond to one digital pedigreed object. The record may be maintained, for example, in a data store 1314 as shown in FIG. 2. The record may have fields including a record number, first pointers, an identifier of the object, security information, and second pointers. The first pointers may include for example, pointers to digital fingerprints of the pedigreed object, other identifiers, or models of the object, and other pedigree and transaction history data. Other fields in the record may comprise or point to one or more of a chain of possession table, a chain of title table, legal terms and conditions, or the like. Each of these may comprise a variety of data and metadata or both, depending on the application and types of objects of interest.

This third-party lending of the ability to update or modify a pedigree shown in the second provenance example is just one example of a general idea within the view of this disclosure, which is the ability to allow another party to modify the digital pedigree of an object (e.g., a digital object or a physical object) based on the rights to modification granted by the owner of the pedigree and the digital fingerprint of the key object he has been given. Those rights may differ for different key objects. The granted rights may have time limitations. Access to the pedigree linked to a digital fingerprint may be requested by a third party or other recipient/holder of the object, such as an inquiry made by a potential purchaser or holder by using the digital fingerprint of the object.

In a related embodiment, the exposure of data within a digital pedigree may also be enabled to allow access by any or all others without allowing that pedigree to be modified. This viewing access may be granted in many ways. One way to grant viewing access, for example, may be by a user name and password; another way may be through a "reduced rights key object" whose digital fingerprint allows access to the digital pedigree but no ability to modify it; and still other ways are contemplated. Any method of strategically organizing and controlling information and data access, such as layered, tiered, staggered, incremental, Chinese-walled or otherwise controlled access may be used in combination with a key object system.

Figure 3:
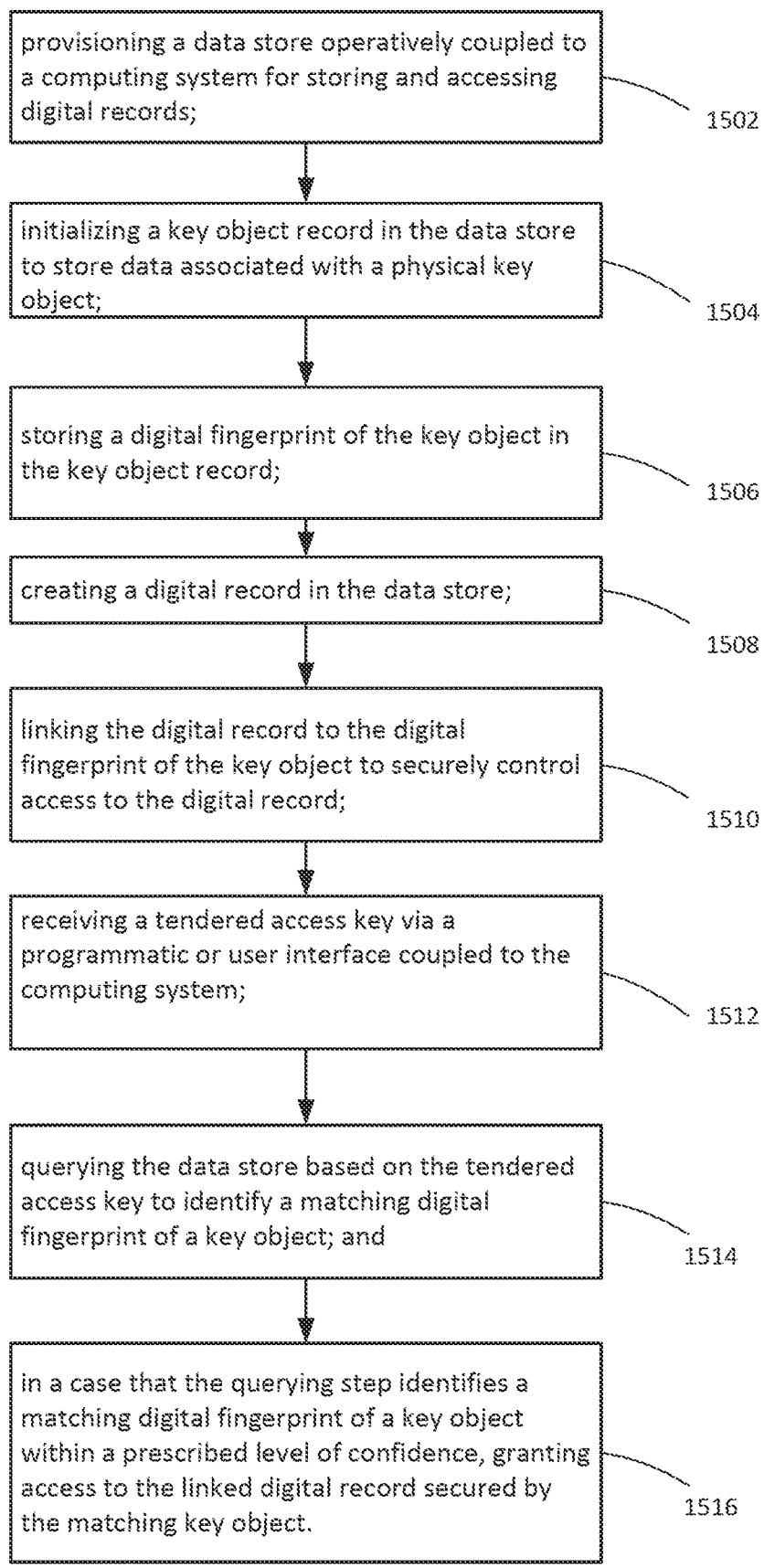
FIG. 3 is a simplified flow diagram of an example process to implement a secure digital fingerprint key object database.

FIG. 3 is a simplified flow diagram of an example process to implement a secure digital fingerprint key object database. In this process, the method comprises the following acts: provisioning a data store operatively coupled to the computing system for storing and accessing digital records, block 1502; initializing a key object record in the data store to store data associated with a physical key object, block 1504; storing a digital fingerprint of the key object in the key object record, block 1506; creating a digital record in the data store, block 1508; linking the digital record to the digital fingerprint of the key object to securely control access to the digital record, block 1510; receiving a tendered access key via a programmatic interface or user interface coupled to the computing system, block 1512; querying the data store based on the tendered access key to identify a matching digital fingerprint of a key object, block 1514; and in a case that the querying step identifies a matching digital fingerprint of a key object within a prescribed level of confidence (e.g., 75% confidence, 95% confidence, 99.999% confidence, or some other level of confidence), granting access to the linked digital record secured by the matching key object, block 1516.

Digital pedigree and contextual data about each transaction or pedigree may be used by many parties, such as appraisers, distributors, resellers, and merchants. Data included as part of a pedigree may be pre-packaged or pre-authorized for use by the possessor of the object. Various applications may use data from the pre-packaged or pre-authorized pedigrees for a range of purposes, such as aiding in online sale listings for the object.

In one embodiment, a digital fingerprint may be used to facilitate the return of lost or stolen objects to their owner or possessor of record. In an example of this application, an individual comes across a seemingly lost or misplaced item of value. The finder may generate a digital fingerprint of the object and, if the object has an existing digital pedigree, use that to discover information relating to ownership or possession. The finder may also use a provided means to contact the last possessor, perhaps anonymously. The means may include information stored in a public repository, information stored in a digital record accessed by the digital fingerprint, or some other means. The last possessor of the object in the scenario would also have the option to mark an object as lost or stolen in digital fingerprint database. An owner may, using the teachings of this disclosure, add to the digital pedigree of a valuable object a non-access-controlled notice of, say, the intent to pay a reward for the return of the object.

In one embodiment, the taught approach provides the ability to automatically update specific or general data or media related to the digital fingerprint records. This ensures records are up-to-date and provides convenience to users. For example, if a product warranty or instructions were updated for the model of the object, the system would perform automated search and replace to ensure its general warranty documentation and instructions are current. In a similar embodiment, the system monitors for events such as product recalls and, optionally, updates the digital pedigree and may push out an alert to the relevant parties.

In one embodiment, the taught approach provides the ability, in association with a transaction, to enable selected users to review and incorporate data from online pedigrees related to the transaction. For example, in an online marketplace transaction, the goods being exchanged, the individuals or entities involved in the transaction, and even the finance and escrow services may all have existing pedigrees that can be accessed by parties to the transaction for the purpose of, for example, determining their suitability. As part of this capability, online bots or other processes may scour the web for available information, such as LinkedIn profiles, and other relevant information for incorporation into the pedigree(s).

In one embodiment, the teachings of this disclosure could be used in concert with the teachings of U.S. Pat. No. 7,676,433: Secure Confidential Authentication with Private Data. That patent disclosed a system that connects a user, a company, or other web site providing services, and a trusted holder of sensitive data about the user. The teachings of the current disclosure could, for example, enable the possession of a key object provided by the trusted holder of sensitive data to the user to be used as a key granting access to requests that the user makes of the trusted holder.

Other supplemental context records, verified or non-verified, may be added to a digital pedigree to increase the object's value, liquidity, or to help the process of future sales. Examples include: adding location and/or other metadata, media, historical provenance data, or sensor data, to records of purchase or transfer. Adding contextual data may reduce risk and add significant value to an object. An example of value creation would include establishing proof of prior or current ownership or use by a collector, celebrity, or historical figure. An example of risk reduction would be a buyer viewing a history of transactions for an object and seeing that a number of people had paid a price in line with the buyer's expectations. Some illustrative records are introduced in FIG. 2.

Aggregating similarities between digital fingerprints and other pedigree information, either partial or complete pedigrees, may be used to create meta-pedigrees for classes and subclasses of objects. This meta-pedigree could be used in parallel to a nested authentication approach to create a "nested pedigree" of the object. This nested pedigree may be used, for example, to create or use analytics related to their similar object classes. Such aggregate information may include trend information, such as number of similar items sold in a lot. This aggregate data may be shared with third parties, object owners, or object manufacturers to provide relationship information for their object against its relevant class or subclass.

In one embodiment, storing and accessing data by tendering a digital fingerprint allows sellers to set the terms of sale on individual objects. This data could be made available for specific-object pricing algorithms enabling precise price discrimination. The teachings, for example, may be used to enable dynamic price adjusting of physical goods where algorithms, such as those that already determine prices for classes of objects, determine the price of individual physical goods at point of sale in real-time, such as buyers and sellers specifying direct transfer of funds to digital wallets or other payment addresses. In this scenario, the price and transaction information of the object may be calculated at the time of sale as a response to using a digital fingerprint of the object to facilitate the transaction. Further embodiments may include incorporating external feedback by providing a mechanism that a buyer or recipient may suggest terms of sale or incorporating dynamic pricing methods, such as time-based pricing of individual objects, like discounting objects when they are perishable and close to their sale-by date. As a further elaboration of the embodiment, the information relevant to the transaction may be incorporated with distributed ledger technologies (e.g., blockchain) and/or cryptography-based currencies.

Method to Establish Ownership to an Object, Digital Pedigree, and Representations The devices, methods, and systems of this disclosure (i.e., the teachings of this disclosure) provide or otherwise enable a means to establish ownership of digital assets or data that are tied to physical objects. Those physical objects ("key objects"), which do not require any other connection to the digital data beyond being used as a key to the digital data, may be used to establish ownership of the digital data.

In some examples, as noted, the digital assets or data may include a pedigree of a physical object. The pedigree may be linked to or part of a digital fingerprint of the physical (pedigreed) object. In one embodiment, each induction or subsequent transaction involving the pedigreed object is used to update a ledger and/or database related to it. In some embodiments, the ledger or database may be managed by a central server system such as the server 1310 in FIG. 1, coupled to a data store 1314. The data store may also be distributed, and the server may be coupled to a network for remote communications. This database and/or ledger is the basis for the pedigreed object's modifiable digital pedigree, the control of which is granted through the key object, or more conveniently, through a digital fingerprint of a physically possessed key object.

In one embodiment, the key object and the pedigreed object are the same object. Because a person must be in possession of an object to generate a digital fingerprint, the ability to generate the fingerprint provides proof of current physical possession of, in this case, the pedigreed object. This is true whether the digital fingerprint is used for induction or for re-identification. Ownership along with physical possession may be established by linking within the digital pedigree record information that establishes or tends to enhance or support the legitimacy of each transfer in the object's history. It should be clear that essentially any digital information may be part of the pedigree of the object, including information about the same or other objects.

In one embodiment, the digital pedigree and/or digital representation may be used in hypothecation of the object with or without physical transfer. Hypothecation, in this instance, enables a debtor to obtain greater liquidity for their physical possessions or any other objects in which the debtor may hold an interest. A digital pedigree and/or representation may, for example, be used in a collateralization process for a debtor to secure a debt or as a condition precedent to the debt. A digital pedigree and/or representation may also be used by third party as part of a collateral pledge for the debtor, where the debtor assigns temporary ownership rights of the object and its digital pedigree to the creditor. This method allows the collateralization to be performed digitally without the presence or movement of the object and, due to the incorporation of digital fingerprints, greatly enhances the reliability of future identification of collateral whose possession is not transferred to the lender.

In one embodiment, the ownership rights to the digital pedigree may be used to mitigate the credit risk of a creditor by providing a method for the creditor to seize sufficient assets of the debtor. If the debtor is unable to pay his debt, the creditor possesses the digital collateral related to the key object or pedigreed object and therefore may claim its ownership, rescind access rights, or otherwise "digitally repossess" the object. This method allows the creditor to prove ownership of the key object or pedigreed object, and revoke the digital rights to the object to compensate for the lack of payment by the debtor. In one example an individual uses a valuable painting as collateral to gain capital. During the desired transaction where credit is needed, the owner of the painting assigns temporary rights of the painting to the creditor. Once the underlying contract that supplied the capital has been fulfilled, the creditor relinquishes ownership back to the debtor.

In one embodiment, access and/or digital rights to a digital fingerprint may be sent or revoked by the possessor of the key object, the pedigreed object, or a third party. The value of a physical object comprises two parts: the object itself and the securely-linked pedigree of an object. A Rolex watch, for example, has a great deal more value if it may be proven to be genuine. The use of the teachings of this disclosure enable at least the digital part of the transfer to be revoked if something (e.g., payment) doesn't take place by a specific time. In some cases, the digital part of the object may only be loaned for a set period of time or the object itself loaned to an appraiser, museum, or some other entity. When that time is passed, unless the former holder of the object does something, the digital fingerprint of the key object no longer may access the digital pedigree. If the pedigreed object itself is purely digital, this loss of access to the pedigree may effectively remove all access to the object itself, limit access to the object, cause attempted use of the object to be reported to the former holder, access to the object to be restored to the former holder, or any of a number of different actions. In one embodiment, the teachings of this disclosure may be used as an alternative to escrow or an enhancer to escrow.

Method to Connect an Object to a Data Store and Pedigree of its Digital Fingerprint In one embodiment, the taught approach allows not just general information to be stored digitally and linked to an object, but also information specific to a particular transaction to be so linked. The teaching of this disclosure may be applied to any transaction having a secure digital component that will benefit from affirmatively controlling access to the component. Exemplary, but not limiting, circumstances where the present secure digital fingerprint key object teaching may apply include transactions involving the sale, loan, or other transfer of the object itself, transactions involving high value items that can be forged or counterfeited, and transactions involving items that are extremely large or extremely small. Many other transactions are contemplated. The teaching disclosed herein establishes a standardized means to transfer specific objects without relying on serialization or the addition of any ancillary materials such as labels or tags. It does so by using the unique digital fingerprint of the object as the key to allowing the transfer of the pedigreed object.

Tokenization

In one set of embodiments a digital fingerprint may be used as a substitute for sensitive data elements. Here, the digital fingerprint of the key object acts as a non-sensitive equivalent or stand-in to the sensitive data elements. As an example, the digital fingerprint of the key object, which an object that may have no extrinsic or exploitable meaning or value outside of the present teaching, is used as a token. The token may stand-in for user names, passwords, or other sensitive data elements. The naturally occurring uniqueness of the digital fingerprint of the object as generated by the present teaching provides a unique token that cannot be duplicated.

In a related but distinct embodiment, creation and/or access to sensitive information related to the use of an object may be associated with the digital fingerprint of the key object. In these cases, access to the sensitive information will be limited, denied, or otherwise controlled without the possession of the key object.

In one embodiment, the use of the key object as a token via digital fingerprinting may be used to ensure privacy, to prescribed level of confidence (e.g., 75% confidence, 95% confidence, 99.999% confidence, or some other level of confidence), of object-specific information or to keep the information hidden from anyone for whom it is not intended. In an example of this embodiment, an individual seeks to encrypt sensitive files on a hard disk or other repository to prevent an intruder from gaining access to the information in the sensitive files. The sensitive files are the "pedigreed object," and access to them is granted through the key object. Access to the secure information (i.e., the sensitive files) may only be granted when the digital fingerprint of the key object is tendered or otherwise presented.

In one example of this use, a digital wallet or connection(s) to digital currency, such as cryptocurrency, e.g., Bitcoin (or equivalent) private key(s) may be tied to a physical object token. The possession of the key object, possibly with other information such as PINs, establishes the right to use the object as a token. An existing technology replaceable by the teachings of this disclosure includes the creation of physical coins used as tokens to digital currency.

This secure tokenization may be used in a wide variety of applications, from cloaking private communications to transferring or accessing sensitive information in a vulnerable environment. A plurality of key objects (e.g., two or more) may, as an example, serve the purpose of enabling one holder to create the secure information and the holder or holders of the other key object enable the recipient to access the secure information.

Digital Fingerprints to Establish Digital Companions

In some embodiments, a method comprises using a digital fingerprint to create a digital companion as a component of the digital pedigree to the physical object. A digital companion in one example may include a representation created by snapshotting various sensor data from the object over time. The data set captured in a snapshot is used to create an object-specific 3D digital re-creation of the original physical object. The digital companion may be created using optical sensor data to create the structure and texture of the digital companion or, for an aggregate digital companion, may be itself aggregated from each component of the original physical object, using nested authentication. This method enables digital companions to reflect the internal structure and texture of the specific object of interest. The teachings of this disclosure can replace existing technology for creating generic digital twins, which may be interpreted in at least some sense as an existing "digital companion" or pedigree, by creating object-specific twins that reflect the individual characteristics of a single object, rather than a class of objects or a low-resolution approximation of the object.

This method also integrates historical data from previous digital fingerprints and sensor data into the object-specific digital pedigree, which may factor into the construction and viewing of the digital companion. For example, a user may view the wear and tear of an object by looking at changes in an object's surface characteristics at any time such surface information was added to the pedigree. In a related embodiment, specific objects may, in a digital reality, be re-created and substituted for more generic objects to produce a better digital reality. That is, replacing a class of objects with their unique digital representation that mirror specific physical objects the real world. Thus, for example, a digital world's garage does not contain a generic automobile, but instead, the digital world's garage does contain a digital representation of a user's specific automobile.

In some embodiments, digital companions can be used to search for other virtual replicas that may infringe ownership rights in digital environments. Digital assets, such as movies and other creative works, are contemplated along with other digital assets. The term, "digital environment" in this disclosure encompasses any digital environment, such as augmented/virtual/mixed reality environments, that enable simulated interaction or digital assets presented in a physical environment. These digital environments include hardware-less technologies (e.g., holograms) and hardware-inclusive technologies (e.g., haptic devices, wearable computing devices, smart glasses (e.g., "google glasses"), and the like). Consider an example, where a form of digital twin is used in commercial computer animation. Here the present teaching that includes acts of creating a digital companion can be used as a reference to search for any form of infringement or copying by comparing digital fingerprints that have been previously inducted.

In some embodiments, a digital companion, properly equipped with data and metadata relevant to the functioning of the object, may be used in virtual object-monitoring simulation models that update and change as the digital companion's real-world physical counterpart changes. Other supplementary data from various sensors may be incorporated to better represent the individual object. The digital companion may be used for monitoring, diagnostics, or prognostics.

In one example, components of a system may be monitored so that component failure within a physical assembly is highlighted on a digital companion and virtually inspected for error. This embodiment, and other such embodiments, mitigates the need for a technician to travel to the physical object to inspect the assembly in person. Instead, the technician can view the digital companion virtually from a convenient location. In other embodiments, such as prognostics, digital companions may contribute as input to control theory-based modeling. As an example, digital fingerprint-based companions may be used to assist in predicting component failure by feeding data into simulations that model the performance of a critical part. Such modeling can predict the breakdown of that part.

Digital companions may be used to create representations in any digital environment. In this example, the digital companion would contain information on the appearance and physical behavior of the object or individual person. As an example, this may enable virtual inspection and/or manipulation of specific items via their digital companion without gaining physical access or opening the contents of an object. For example, a user in a digital environment might view a digital companion of a semiconductor within a computer in cases where information (e.g., electron microscopic image data, images of an electronic device prior to sealing a final housing, and the like) of the semiconductor was inducted into the computer's aggregate companion prior to the physical computer being sealed. The user can then validate that the correct part was installed, integrated, formed, or the like. This enables a method to validate the components without having to open the machine. Because the digital companion and its pedigree exist in the digital world, they are protected separately from that of the physical computer and these types of practices circumvent issues with breaking security seals on the machine and other risks associated with disassembly and reassembly or even destruction of the underlying physical object.

The digital companions of physical objects may have value after the underlying physical item has been destroyed, lost, or stolen. Consider the following examples:

In the case of forensic study of a crashed plane.

Where digital companions are analyzed for sources of failure.

In using the digital companion to recreate a replica of the original object. With a properly complete digital companion an object that has been lost, destroyed, or is in accessible can be re-created.

In a scenario where the digital companion of an individual is used to recreate the individual or object in a virtual environments or digital asset, such as a film or video game.

In one embodiment, digital companions and their related pedigrees may be used as a store for any biometric data for an individual or object. Consider examples, where specific data is collected related to an individual or object:

Unique behavior, such as gait or keystroke habit

Specific audio such as voice patterns

Digital fingerprints of an iris

Digital fingerprints of fingerprints

Thermal signature

In some embodiments, the digital companion may be used for security challenges for users or third parties during authentication. In order to prevent the submission of fraud data, the authentication system may ask a user or other party wanting to perform authentication to submit images or video from different orientations to further establish credibility of possession. These security challenge requests may be generated randomly or designated by the object possessor of record. For example, the system may request the user to submit random images, used in digital fingerprint comparisons, from different orientations. These challenges can be paired with any other biometric recording such as voice or thermal signature. In one such example, a user could be asked to move his head in a pre-determined orientation and say his name. The movements and voice would provide additional proof during authentication.

Progressive Induction

In some embodiments, a method of progressive induction, authentication, and identification of objects, which at least in this case may be collectively referred to as "authentication," is realized where the digital pedigree of a physical object is updated with higher-relevancy data as such data is obtained. In this way, the authentication may be progressively improved.

Consider, as an example, an automated drone authenticating objects within a scene. The sensors on the drone can collect more data on objects that are in closer proximity. As the drone moves closer to other objects, it obtains higher resolution images, and the original, lower-scored digital fingerprint may be supplanted for higher-scored versions of those particular objects.

Authentications within a scene may be scored, and the highest-graded authentications of objects may be referred to as "anchors." In one embodiment using this teaching, a scene is graded into authentication zones. Each authentication zone may have its own expectation about the quality of data that may be obtained through collection of digital fingerprints. In this approach, objects within the determined highest qualified view of sensors may be scored as anchor authentications. Each subsequent zone may be indexed in parallel by collecting digital fingerprints that may be scored appropriately to the quality of sensor data collected at that time. As sensors are moved through a scene, objects may be re-authenticated. Each object's digital fingerprint may be flagged as an anchor within the digital pedigree when higher-quality data is collected by a sensor.

At least some embodiments of this feature may utilize any device with optical sensors, such as all forms of robotics, drones, or manual devices such as smartphones or smart glasses. Consider an example where an individual wearing smart glasses authenticates all objects within view during normal use of wearing the smart glasses. As the wearer of smart glasses moves through a scene, the authentications may be evaluated and flagged as anchors when there is a higher score.

This example facilitates convenient induction of objects in their current location while leveraging the context of other inducted objects to establish provenance. In this process, contextual data from each scene is used to set or qualify context. For instance, if a drone is used to induct all objects in a warehouse, the system may assume the provenance of the object to be that warehouse. Therefore, the system may use data attributes such as geolocation of the warehouse, the proximity to other items of its kind within the warehouse, proximity to other expected objects, and time to establish confidence in the provenance of the object. For example: an object inducted at a secure facility is likely to be genuine; an object in the proximity of 1,000 objects of its same kind is more likely to be genuine; an object next to a unique machine that creates such objects is more likely to be genuine; an object created at a certain time that may be cross-referenced with other production records is likely to be genuine, and so on. Other like examples are contemplated.

Consider another example of a system that is used to induct, and later to re-identify the artwork in a museum. As the induction device, which may in some cases be automated or worn or operated by a curator, approaches each object, the device acquires progressively better images from which digital fingerprints are created. These progressively improved (e.g., more detailed) digital fingerprints allow better and better discrimination of the objects until the system decides it knows enough to distinguish, for example, the one particular object (e.g., painting or other artwork) from all copies of that object. At each stage, the digital pedigree of the object (e.g., painting or other artwork) may be updated and flagged as an anchor with higher-relevancy data as such data is obtained. This process can provide progressively better re-identification of objects already inducted. The results are scored, and the highest-scored inductions preserved for later object re-identification.

The same process, or processes along these lines, may be applied at re-identification. In these cases, the imager approaches an object while extracting progressively better (i.e., more information-filled) digital fingerprints until the system either successfully re-identifies the object or determines the object is not in its database. The system then reports the results as desired. Either the determined best induction, or some set of inductions, is preserved for later use. If more than one induction is preserved, the digital fingerprints extracted from the plurality of inductions may be aggregated by various means to improve later re-identification.

Hardware and Software

At least some of the structures (e.g., devices, apparatus, systems and the like) discussed herein comprises electronic circuits and other hardware along with associated software. For example, a conventional portable device (e.g., mobile phone, smartphone, tablet, wearable computer, Internet of Things (IoT) device, and other such computing devices) is likely to include one or more processors and software executable on those processors to carry out the operations described. The term software is used herein in its commonly understood sense to refer to programs or routines (e.g., subroutines, objects, plug-ins, etc.), as well as data, usable by a machine or processor. As is well known, computer programs generally comprise instructions that are stored in tangible, non-transitory machine-readable or computer-readable, storage media. Some embodiments of the present disclosure may include executable programs or instructions that are stored in machine-readable or computer-readable storage media, such as a digital memory. One of skill in the art will recognize that a computer, in the conventional sense, is not required in any particular embodiment. For example, various processors, embedded or otherwise, may be used in equipment taught in the present disclosure.

Memory for storing software is well known. In some embodiments, memory associated with a given processor may be stored in the same physical device as the processor (i.e., on-board memory); for example, RAM or FLASH memory disposed within an integrated circuit microprocessor or the like. In other examples, the memory comprises an independent device, such as an external disk drive, storage array, or portable FLASH key fob. In such cases, the memory becomes associated with the digital processor when the two are operatively coupled together, or in communication with each other, for example by an I/O port, a communication bus, network connection, etc. such that the processor can read information (e.g., a file) stored on the memory. Associated memory may be read-only memory by design (ROM) or by virtue of permission settings, or not. Other examples include, but are not limited to, WORM, EPROM, EEPROM, FLASH, etc. Those technologies often are implemented in solid state semiconductor devices such as integrated circuits. Other memories may comprise moving parts, such as a conventional rotating disk drive. All such memories are machine readable, computer-readable, or another like term, and all such memories may be used to store executable instructions for implementing one or more functions described herein.

A software product refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. Those of ordinary skill in the art recognize that software can be distributed via electronic transmission (e.g., download), in which case there will at least sometimes be a corresponding software product at the transmitting end of the transmission, the receiving end of the transmission, or both the transmitting and receiving ends of the transmission.

Additional Illustrative Applications

In some embodiments, a single physical object is scanned, and a unique digital fingerprint is generated from features in the structure of the material substance of which the physical object consists, so that the unique digital fingerprint will not generate an unequivocal match to any other scanned physical object, even if that other object is apparently identical in appearance to the human eye. This digital fingerprint, which is distinctive and unique is stored in an object digital fingerprint record, to which records, physical or digital, are added that relate to the physical object, creating a secure archive of object information and object history. In some embodiments, records that are added to the object digital fingerprint record, such as paper-based records relating to the physical object, may themselves be digitally fingerprinted and the digital fingerprint of the records are stored in the object digital fingerprint record and/or in a separate digital fingerprint record.

In one embodiment, a property registry implementation may include or allow various components or aspects of property commonly classified as real estate, either independently or as part of a land registry, as digital fingerprinting allows a higher degree of reliability of identification of, for example, fixtures, which is not present in traditional forms of land registration.

In one embodiment, a central registry may be configured to track the presence and/or condition of various fixtures, such as certain valuable building materials (e.g., hardwood flooring, marble or other stone finishes, plumbing fixtures, decorative elements, or other finishes), or trade fixtures (e.g., custom fixtures, machinery, custom electrical parts, etc.). Such a registry would allow, for example, landlords to quickly and definitively ascertain whether a tenant has removed or repaired fixtures without proper notice or permission. Also, a common difficulty in land transactions can be the proper classification of land fixtures and chattels. A secure centralized property registry may be used to supplement land descriptions by creating or classifying component inventories in a manner that will prevent or reduce the risk of subsequent disputes.

The registry does not have to be indexed by object, it may be configured to be indexed both by object or by object components, as desired by the registry owner or property stakeholder. In one embodiment, the system is configured to read the object according to an automatic or manually tailored object template. This allows the tracking of the presence or condition of individual components of whole, composite, or assembled objects—for example whether a key component that is part of the owner's object has been replaced with a different component (whether due to theft, conversion, repair, or other reasons). The owner or stakeholder in the property may define the template according to the type of interest desired to be tracked or protected. The fingerprint template may be configured to indicate the presence of alterations, such as by normal wear or tear, or more serious adulterations such as the replacement or absence of components or portions of the object.

In some embodiments, the system is configured specifically to allow stakeholders to create a general or custom documentation trail for the purposes of ascertaining liability. In one embodiment, the system will track certain conditions of an object with a view to ascertain where and when an "alteration" (in the sense used in strict product liability) has occurred. Currently, proving the "alteration" element in cases involving strict product liability presents considerable difficulty for merchants in the product distribution line, exposing the merchant to risk of liability for the condition of the product. Proper tracking of object "alterations" (which may include the product and associated packaging) will provide merchants in a distribution line the opportunity to defend against liability by creating reliable business records of the presence and condition of an ascertainable product during the time the product is in the merchant's possession. For example, an innocent merchant may be able to show that an electronic item which malfunctioned and caused injury due to damage, was not (or likely not) damaged while it was in his possession, e.g., due to the condition of the item (or its relevant component) and its shipping box or other externalities upon arrival and departure from his warehouse.

In another embodiment, the system is configured to track object attributes relevant to stakeholders who, for example, loan out their objects. Here, the system will be configured to track elements that would facilitate actions for trespass to chattel or conversion should the object be unduly interfered with. A secure central property registry may also serve to increase the availability or success of so-called "real actions" in personalty, i.e., where a dispossessed owner has his property returned to him, rather than receiving monetary damages. Real actions are widely available in reality disputes but much less utilized in personalty disputes, in part due to the difficulty of conclusively identifying an object of personalty, or its components, which difficulty the proposed system may successfully overcome.

The language of the present disclosure centers on objects of personal property but the concepts discussed may be applied to any other types of property, real or personal, tangible or intangible. Registries described as centralized may also be distributed or otherwise decentralized.

As described herein, for simplicity, a user of the devices, systems, and methods may in some cases be described in the context of the male gender. It is understood that a user can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The trust-proxy embodiments as taught in the present disclosure provide several technical effects and advances to the field of authenticated access to digital data based on a digital fingerprint of a physical key object. Rights to access the digital data may be exclusive or non-exclusive. Authorized parties may share or transfer rights to access the digital data. One or more entities may have concurrent access to the digital data. One entity may be a first set of rights with respect to the digital data, and a second entity may have a different second set of rights with respect to the digital data. Rights to the digital data stored in the data store are acquired by tendering an access key. The access key may be received via a programmatic interface or user interface. If the access key that is tendered includes data that matches a digital fingerprint of the physical key object, then access to the digital data will be granted. These and other technical effects are implemented with scanning technology, digital image processing technology, and other computing technology.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer-readable storage medium whose stored contents configure a computing system to perform a method, the method comprising:
   provisioning a data store operatively coupled to the computing system for storing and accessing digital records;
   initializing a key object record in the data store to store data associated with a physical key object;
   storing a digital fingerprint of the physical key object in the key object record;
   creating a digital record in the data store that is not the key object record;
   linking the digital record to the digital fingerprint of the physical key object, said linking arranged to provide secure control access to the linked digital record;
   receiving a tendered access key via a programmatic interface or user interface coupled to the computing system;
   querying the data store based on the tendered access key to identify a matching digital fingerprint of a key object; and
   in a case that the querying identifies the matching digital fingerprint of the key object within a prescribed level of confidence, granting access to the linked digital record secured by the key object.

2. The non-transitory computer-readable storage medium according to claim 1, the method further comprising:
   authenticating a user as a proprietor of the linked digital record based on an access key tendered by the user;
   responsive to input from the authenticated user, modifying the digital record to enable a second physical key object to grant access to the digital record secured by the physical key object;
   initializing a second key object record in the data store, the second key object record arranged to store data associated with the second physical key object;
   storing a digital fingerprint of the second key object in the second key object record; and
   further linking the linked digital record to the digital fingerprint of the second key object.

3. The non-transitory computer-readable storage medium according to claim 2 wherein the physical key object permits first access rights to the linked digital record and the second physical key object permits second access rights to the linked digital record, where the second access rights are different from the first access rights.

4. The non-transitory computer-readable storage medium according to claim 1 wherein the linked digital record secured by the physical key object corresponds to a first physical object, and the linked digital record includes a digital fingerprint acquired from the first physical object.

5. The non-transitory computer-readable storage medium according to claim 4 wherein:
the linked digital record includes digital pedigree data of the first physical object; and
permissions stored in the data store in association with a matching access key are arranged to permit additions to the stored pedigree data.

6. The non-transitory computer-readable storage medium according to claim 5 wherein the digital pedigree data includes supplemental context data that includes at least one of location data, metadata, media, or sensor data.

7. The non-transitory computer-readable storage medium according to claim 5 wherein the digital pedigree data includes supplemental context data that includes at least one of records of purchase and records of transfer of the first physical object.

8. The non-transitory computer-readable storage medium according to claim 5, the method further comprising:
generating a digital companion as a component of the digital pedigree data to the first physical object, wherein the digital companion is a representation created by aggregating various sensor data acquired in relation to the first physical object over a selected period of time.

9. The non-transitory computer-readable storage medium according to claim 8, the method further comprising:
generating the digital companion based on optical sensor data to create structure and texture of the digital companion; and
creating an object-specific 3D digital re-creation of the first physical object based on the digital companion.

10. The non-transitory computer-readable storage medium according to claim 4 wherein the physical key object is a certificate of authenticity of the first physical object.

11. The non-transitory computer-readable storage medium according to claim 4, the method further comprising:
forming an aggregate digital companion, by aggregating one or more components of the first physical object, using nested authentication.

12. The non-transitory computer-readable storage medium according to claim 1 wherein the linked digital record includes or links to historical provenance data of the physical key object.

13. The non-transitory computer-readable storage medium according to claim 1 wherein the granted access is circumscribed by permissions stored in the key object record or the linked digital record.

14. The non-transitory computer-readable storage medium according to claim 1, the method further comprising:
receiving an access key via a third-party software application or user interface;
authenticating the access key based on identifying a matching key object record in the data store; and
conditioned on the authenticated access key, granting rights to change access rights, changing the access rights to a corresponding digital record to enable use of credentials, said credentials including at least one of a specified user name, a specified password, and a second key object defined by a digital fingerprint of the second key object.

15. The non-transitory computer-readable storage medium according to claim 1, the method further comprising:
receiving an access key via a third-party software application or user interface;
authenticating the access key based on identifying a matching key object record in the data store;
receiving certification data via the third-party software application or user interface; and
conditioned on the matching key object record, permitting addition of the certification data, storing the certification data as pedigree data of a physical object record linked to the matching key object record.

16. A computer-implemented method, comprising:
acquiring a digital fingerprint of a first key object;
storing the digital fingerprint of the first key object in a key object record of a data store;
creating a digital record in a data store that is not the key object record;
linking the digital record in the data store to the digital fingerprint of the first key object, said linking arranged to provide secure control access to the digital record;
receiving a tendered access key;
querying the data store based on the tendered access key to identify a matching digital fingerprint of a key object; and
in a case that the querying identifies a matching digital fingerprint of the key object within a prescribed level of confidence, granting access to the linked digital record secured by the key object.

17. The computer-implemented method according to claim 16 wherein granting access to the linked digital record secured by the key object includes transferring the linked digital record to complete a transaction involving the linked digital record.

18. The computer-implemented method according to claim 16 and further comprising:
receiving an access key tendered via a programmatic interface or user interface;
authenticating a user as a proprietor of the digital record secured by the first key object based on the access key;
responsive to input from the authenticated user, modifying the digital record to enable a second key object to grant access to the digital record secured by the first key object;
initializing a second key object record in the data store, the second key object record arranged to store data associated with the second key object;
storing a digital fingerprint of the second key object in the second key object record; and
further linking the digital record to the digital fingerprint of the second key object, the further linking arranged to enable access to the digital record without requiring the first key object.

19. The computer-implemented method according to claim 18, wherein the first key object is arranged to permit first access rights to the digital record, wherein the second key object is arranged to permit second access rights to the digital record, and wherein the second access rights are different from the first access rights.

20. The computer-implemented method according to claim 18, wherein the further linked digital record includes sensitive data, and wherein the sensitive data is protected by a requirement that a token including a digital fingerprint of the first key object or the second key object be presented to receive access to the sensitive data.

* * * * *